March 21, 1933. J. SEGER 1,902,380
ANNULAR DOWEL FOR TIMBER BONDS
Filed Sept. 11, 1930

Inventor:
Jacob Seger
By Henry Orth
Atty

Patented Mar. 21, 1933

1,902,380

UNITED STATES PATENT OFFICE

JACOB SEGER, OF ZURICH, SWITZERLAND, ASSIGNOR TO THE FIRM LOCHER & CIE., OF ZURICH, SWITZERLAND

ANNULAR DOWEL FOR TIMBER BONDS

Application filed September 11, 1930. Serial No. 481,297.

This invention relates to annular dowels for timber bonds, i. e. for system points of lattice work, systems of dowelled beams and the like. Preferably the outer circumference of the ring is cylindrical and the inner circumference tapering down from the middle plane of the ring towards both of its end faces.

For obtaining a certain elasticity of the annular dowel and compensating internal stresses in the wood it has been, heretofore proposed to provide dowels of this type with an axial slot. This measure, however, was found to be objectionable as it caused the wood to spring which particularly at the joints is undesirable.

The object of the present invention is to avoid this drawback by constructing the annular dowel according to the invention in two parts.

With this arrangement both abutting faces of both halves of the ring may be plane or the two abutting faces may be S-shaped respectively, so as to form an overlapping hinge-like joint, for the ring halves. In both cases the abutting faces extend parallel to each other.

The elasticity of a bipartite annular dowel of this type and its ability to adapt itself to the deformations of the wood is obviously much greater than in the case of an integral split-ring. Thereby, the annular dowel adjusts itself without causing internal stresses.

In the drawing a constructional form of the invention is illustrated, by way of example only, in which Fig. 1 is an end view of an annular dowel, Fig. 2 is a section on the line II—II in Fig. 1;

Figure 1:
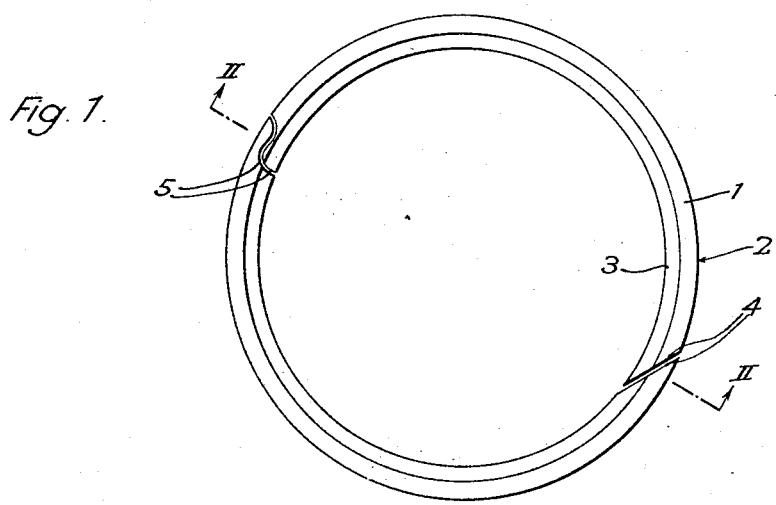
Figure 2:
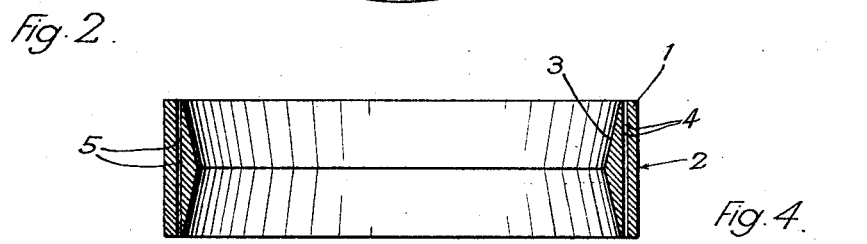

Referring to the drawing, 1 denotes a bipartite annular dowel having an outer cylindrical circumference 2 and an inner circumference 3 which is tapering down from the middle plane of the ring towards both of its end faces. The abutting faces 4 between the two halves of the ring, as shown on the right hand side in Fig. 1, are obliquely disposed to the radial direction and extend parallel to each other, whereas the abutting faces 5 shown on the opposite side of the ring are formed into S-shape, the two surfaces being congruent curves of parallel disposition. The S-shaped faces form together axially extending sockets and knobs which interlock against overturning movement of the halves of the ring while offering no resistance to opening and closing movements.

Figures 3, 4:
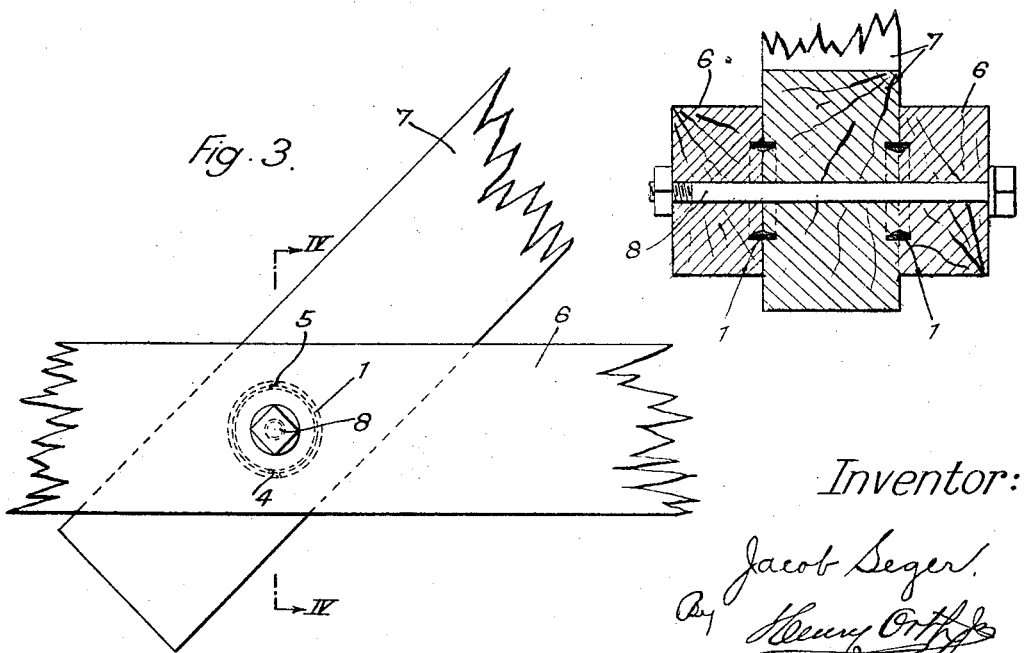
Fig. 3 is an elevation of a timber bond with the dowel applied thereto.
Fig. 4 is a section on the line IV—IV in Fig. 3.

The described bipartite ring is inserted between the adjoining timbers 6, 7 (see Figs. 3 and 4) in such manner that the diameter through its joints is perpendicular to the direction of extreme shrinkage in the wood of the timber juncture. For inserting the two rings 1 the timbers 6 and 7 are notched out at the corresponding places, so that the larger diameter of the notch is made equal to the outer diameter of the apertured ring and the inner diameter increases toward the bottoms of the notches so that when corresponding timbers are put together with the notches in correspondence, the shape of the two notches together is substantially similar to a dowel ring, as shown in Fig. 4, and then the timbers are pressed together by means of the bolt 8.

Under the influence of the forces acting on the ring due to the shrinkage of the wood the abutting faces of both halves of the ring close on each other, whereby the joint with the curved abutting faces 5 has the effect of a hinge which transmits the respective thrusts to the timbers without intermission at this place, the abutting faces of the ring joints overlapping each other, whilst the ring as a whole is nevertheless highly elastic. The S-shape of the hinge, while permitting opening and closing movements of the halves of the ring without introducing internal secondary stresses, nevertheless offers a very substantial resistance to tendencies of the halves to overturn individually.

The described annular dowel due to its capability of yieldingly engaging the side portions of the groove in which it is accommodated in the adjoining timbers of the bond always receives the shear arising between these timbers under favorable conditions of loading which permits of keeping the amount of material applied to it down to a minimum. Thus the loading obtained for the dowel corresponds to that of a cantilever supported at its thickest portion i. e., in the middle of the ring, with the bending moments decreasing towards the ends. Owing to this fact the ends of the dowel can be reduced without impairing the strength thereof, wherein a saving of material is involved.

I claim:

1. In a timber bond, the combination with grooves provided in the surfaces of the timbers to be joined, said grooves forming internal cores the sides of said cores tapering inward from the bottom of the grooves to the jointing surfaces of the timbers, of a bipartite annular dowel having a cross-section corresponding to that of the juxtaposed grooves, the opposite faces of the dowel joints being parallel and at least one of said joints S-shaped, the ends of the two parts at the S-shaped joint being formed with interlocking axially extending sockets and knobs permitting opening and closing movements while opposing separate overturning movements of the two parts, and tightening means for said timbers adapted to press said dowel home in said grooves so as to yieldingly engage the side portions of said grooves.

2. In a timber bond, the combination with grooves provided in the surfaces of the timbers to be joined, said grooves forming internal cores and the sides of the cores tapering inward from the bottom of the grooves to the jointing surfaces of the timbers, of a bipartite annular dowel having a cross-section corresponding to that of the juxtaposed grooves, the opposite faces of the dowel joints being parallel and one joint plane and obliquely disposed to the radial direction and the other dowel joint S-shaped, the ends of the two parts at the S-shaped joint being formed with interlocking axially extending sockets and knobs permitting opening and closing movements while opposing separate overturning movements of the two parts, and tightening means for said timbers adapted to press said dowel home in said grooves so as to yieldingly engage the side portions of said grooves.

In testimony whereof, I have signed my name to this specification.

JACOB SEGER.